United States Patent
Brandenburg et al.

(10) Patent No.: US 8,333,824 B2
(45) Date of Patent: Dec. 18, 2012

(54) SORPTION AGENT COMPRISING AN ACTIVATED CARBON IMPREGNATED WITH A ZINC COMPOUND AND A MOLYBDENUM COMPOUND AND GAS-FILTERING ELEMENT CONTAINING THE SORPTION AGENT

(75) Inventors: Benjamin Brandenburg, Lübeck (DE); Klaus Ammann, Sereetz (DE); Björn Wiese, Stockelsdorf (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 327 days.

(21) Appl. No.: 12/715,639

(22) Filed: Mar. 2, 2010

(65) Prior Publication Data
US 2010/0275922 A1    Nov. 4, 2010

(30) Foreign Application Priority Data
May 2, 2009    (DE) .................. 10 2009 019 737

(51) Int. Cl.
    *B01D 53/02*    (2006.01)
(52) U.S. Cl. ............... 95/135; 95/136; 95/137; 95/901; 128/205.27; 502/416; 96/153; 55/DIG. 33
(58) Field of Classification Search ............ 128/205.27; 502/416; 96/153; 95/135–137
    See application file for complete search history.

(56) References Cited

U.S. PATENT DOCUMENTS

| | | | |
|---|---|---|---|
| 2,722,504 A * | 11/1955 | Fleck | 208/110 |
| 3,318,662 A * | 5/1967 | Pauling | 423/522 |
| 3,518,206 A * | 6/1970 | Stiles et al. | 502/64 |
| 4,174,373 A * | 11/1979 | Yoshida et al. | 423/239.1 |
| 4,670,360 A * | 6/1987 | Habermann et al. | 429/485 |
| 4,801,311 A * | 1/1989 | Tolles | 95/128 |
| 5,063,196 A * | 11/1991 | Doughty et al. | 423/240 R |
| 5,492,882 A * | 2/1996 | Doughty et al. | 502/417 |
| 6,796,896 B2 * | 9/2004 | Laiti | 454/229 |
| 7,309,513 B2 | 12/2007 | Brey et al. | |
| 7,311,764 B2 * | 12/2007 | Friday et al. | 96/134 |
| 7,425,521 B2 * | 9/2008 | Kaiser et al. | 502/401 |
| 7,744,682 B2 * | 6/2010 | McCarthy | 96/224 |
| 2010/0050583 A1 * | 3/2010 | Croll et al. | 55/524 |

FOREIGN PATENT DOCUMENTS

| | | |
|---|---|---|
| DE | 40 11 221 A1 | 10/1991 |
| WO | 9400383 A1 | 1/1994 |

* cited by examiner

*Primary Examiner* — Duane Smith
*Assistant Examiner* — Christopher P Jones
(74) *Attorney, Agent, or Firm* — McGlew and Tuttle, P.C.

(57) ABSTRACT

A sorption agent comprising activated carbon and an impregnation of the activated carbon for the sorption of air pollutants, wherein the impregnation contains a zinc compound and a molybdenum compound, as well as a gas-filtering element, such as a respirator canister, containing said sorption agent.

14 Claims, 2 Drawing Sheets

SORPTION AGENT COMPRISING AN ACTIVATED CARBON IMPREGNATED WITH A ZINC COMPOUND AND A MOLYBDENUM COMPOUND AND GAS-FILTERING ELEMENT CONTAINING THE SORPTION AGENT

CROSS REFERENCE TO RELATED APPLICATIONS

This application claims the benefit of priority under 35 U.S.C. §119 of German Patent Application DE 10 2009 019 737.0 filed May 2, 2009, the entire contents of which are incorporated herein by reference.

FIELD OF THE INVENTION

The present invention pertains to a sorption agent comprising an impregnated activated carbon for the sorption of air pollutants, wherein the impregnation has a zinc compound and a molybdenum compound, and to a gas-filtering element, e.g., a respirator canister, containing the above-mentioned sorption agent.

BACKGROUND OF THE INVENTION

Broad band filters in respirator canisters or in gas-filtering elements offer the user comprehensive protection against a great variety of harmful gases. Such a comprehensive protective action of a gas filter imposes high requirements on the chemical performance of the activated carbons used. To enable such activated carbons to remove the greatest possible variety of chemically different reactive harmful gases, these activated carbons must be chemically impregnated.

A large number of inorganic and organic compounds, for example, basic copper and zinc carbonates, copper and zinc sulfates, sodium dichromate, sodium molybdate, sodium vanadate, ammonium chloride, ammonium carbonate, silver nitrate as well as TEDA (triethylenediamine) or tartaric acid and salts thereof are known for impregnating activated carbons for use in gas filters. Chromate, which is often classified as carcinogenic by experts, has been regularly eliminated in impregnations of activated carbons for use in gas canisters. The necessary chemical action is ensured, instead, among other things, by molybdates and vanadates.

Copper-containing activated carbons are known as well. An essential drawback of the copper-containing activated carbons is the possibility of formation of cyanogen upon admission of HCN after storage of the filter. Cyanogen possesses toxic properties comparable to those of HCN, but it cannot be perceived by humans. Consequently, the user could not recognize the breakthrough of his or her breathing filter in an environment contaminated with HCN and could even run the risk of becoming poisoned with cyanogen without noticing it. To ascertain that the user of a breathing filter can perceive the breakthrough of his or her filter, which may possibly have already been stored for a rather long time, in an HCN-contaminated environment, the activated carbon contained in the filter must not form cyanogen at any time.

Cyanogen is formed from HCN in the presence of copper compounds in a basic environment, more precisely by Cu(II) salts, which react while undergoing reduction to Cu(I). The formation of cyanogen by $Cu^{2+}$ is as follows:

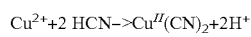

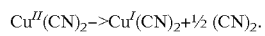

The presence of a sufficient quantity of suitable oxidants, for example, chromates, molybdates or vanadates, on the copper-containing activated carbon can prevent the release of cyanogen.

Should the ratio of copper to the oxidant decrease, e.g., due to aging effects, the risk of release of cyanogen will increase (Table 1). It has now been found that the formation of cyanogen can be avoided by eliminating the use of Cu(II) compounds.

Besides the prior-art activated carbons, which are free from chromates but do, however, contain molybdate, there also are impregnated activated carbons in the area of broad band filters, which activated carbons do entirely without oxo anions of groups V and VI. Impregnations that contain neither oxo anions of groups V and VI nor copper salts are known as well. The activated carbons are impregnated with small quantities of very expensive silver salts in both cases and sometimes also contain larger quantities of zinc salts. However, the silver salts used for the impregnation predominantly react on the activated carbon by forming elemental silver, which has formally no oxidizing action. Since neither copper salts nor oxidants are present on such an activated carbon, such activated carbons have a markedly poorer performance with respect to $SO_2$ and $H_2S$. Even though this property can be partially compensated by increasing the percentage of water on the activated carbon, the separation capacity for organic non-polar harmful gases is lowered by this measure. Furthermore, the storage of filters with activated carbon with high water content should be considered with markedly more criticism. Drying out of the activated carbon leads to major loss of performance, e.g., in case of the adsorption of $SO_2$ or $NH_3$.

SUMMARY OF THE INVENTION

The object of the present invention was consequently to make available a sorption agent for gas filtration, which contains no chromium and/or copper, minimizes or eliminates the risk of release of cyanogen and is nevertheless as versatile as possible in terms of the sorption of various harmful gases. In addition, correspondingly equipped gas filters shall still be able to be used reliably even after longer storage.

The object is surprisingly accomplished according to the invention by a sorption agent comprising activated carbon and an impregnation of the activated carbon for protection against air pollutants or gaseous harmful substances, the impregnation containing:

0.5 wt. % to 15 wt. % of at least one zinc compound and
0.5 wt. % to 15 wt. % of at least one molybdenum compound, wherein the molybdenum compound is an oxo anion, dioxo anion or polyoxo anion compound, each wt. % being relative to the dry weight of the impregnated activated carbon, and wherein the sorption agent contains:
no chromium and no chromium compound, and
no copper and no copper compound.

According to a further aspect of the invention a gas-filtering element is provided containing a sorption agent as noted. Further a respirator is provided comprising a respirator structure and a gas-filtering element containing a sorption agent as described.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
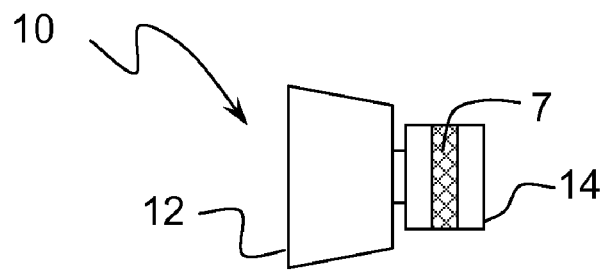
FIG. 1 is a schematic view of a respirator with a gas-filtering element containing a sorption agent.

Referring to the drawings in particular, FIG. 1 presents a schematic showing of a simple respirator generally designated 10. The respirator 10 includes a respirator body or respiration structure 12 as well as a gas filtering element support 14 with a filter 7 containing a sorption agent according to the invention.

Zinc compounds are capable of binding HCN in a basic environment permanently and without the formation of the toxic cyanogen. They do not require oxo anions to be present. The following shows the irreversible binding of HCN to $Zn^{2+}$ in a basic environment $$Zn^{2+} + 2\ HCN \rightarrow Zn^{II}(CN)_2 + 2H^+.$$

Copper-free, zinc-containing impregnations are therefore still able to offer a sufficiently good protection against HCN even after longer storage (artificial aging at elevated temperatures).

TABLE 1

| Impregnation | Retention time for HCN (desired value according to the EN 14387 standard) 25 minutes | |
| --- | --- | --- |
| | not aged | after artificial aging |
| Cu/Zn/Cr* approx. 7 wt. % | 36 minutes 100% HCN | 19 minutes 100% $(CN)_2$ |
| Cu/Zn/Mo* approx. 7 wt. % | 36 minutes 100% HCN | 28 minutes 100% $(CN)_2$ |
| Zn/Ag* approx. 12 wt. % | 45 minutes 100% HCN | 28 minutes 100% HCN |
| Zn/Mo approx. 7 w. % | 45 minutes 100% HCN | 35 minutes 100% HCN |

*Not according to the present invention

To ensure that the copper-free, zinc-containing impregnations can offer sufficiently good protection against $SO_2$ and $H_2S$ in the less wet state as well, impregnation with oxo anions, such as molybdate, is markedly more effective on activated carbon than silver-containing impregnations.

TABLE 2

| | Retention time according to the EN 14387 standard | |
| --- | --- | --- |
| Impregnation and percentage of water | 20 minutes $SO_2$ | 40 minutes $H_2S$ |
| Cu/Zn/Cr $H_2O$* approx. 7 wt. % | 26 minutes | 147 minutes |
| Cu/Zn/Mo $H_2$* approx. 7 wt. % | 25 minutes | 127 minutes |
| Zn/Ag $H_2O$* approx. 12 wt. % | 21 minutes | 43 minutes |
| Zn/Mo $H_2O$ approx. 7 wt. % | 25 minutes | 70 minutes |

*Not according to the present invention

A formula according to the present invention for preparing a zinc- and molybdate-containing impregnation as well the chemical performance of an activated carbon thus impregnated with respect to harmful gases will be presented below as an example.

EXAMPLE 740 g of zinc carbonate, 320 g of ammonium chloride, 290 g of ammonium carbonate and 250 g of sodium molybdate are dissolved. Then, 4.5 kg of activated carbon are impregnated with this impregnating solution and the pourable impregnated activated carbon thus obtained is carefully heated and dried in a drier (for preparation, see FIG. 2).

Figure 2:
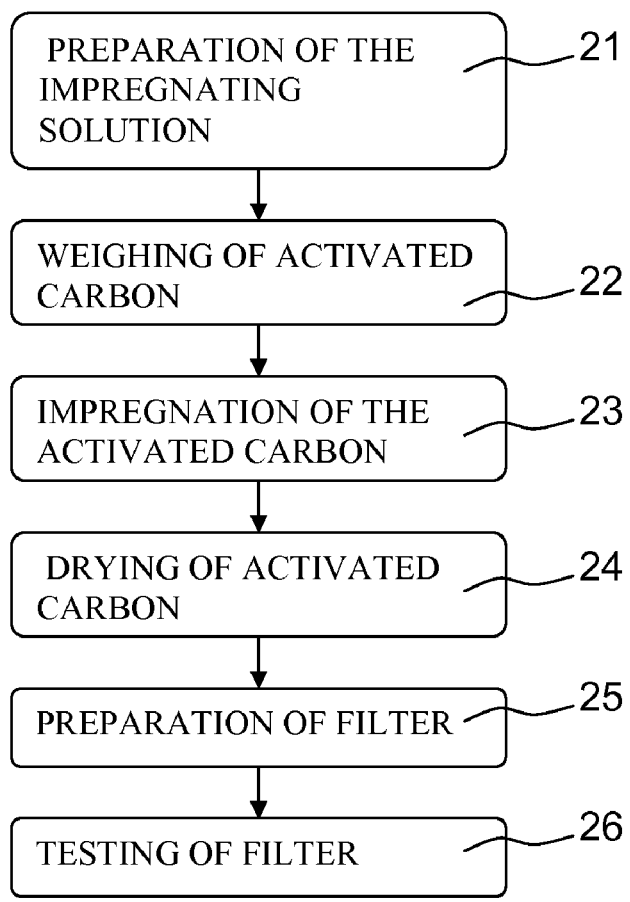
FIG. 2 is a diagram showing preparation steps and validation for the sorption agent.

FIG. 2 shows the steps for the preparation and validation of the impregnated activated carbon. The steps include preparation of the impregnating solution 21, weighing of activated carbon 22, impregnation of the activated carbon 23 and the drying of activated carbon 24. The steps continue with the preparation of filter 25 and the testing of filter 26.

Figure 3:
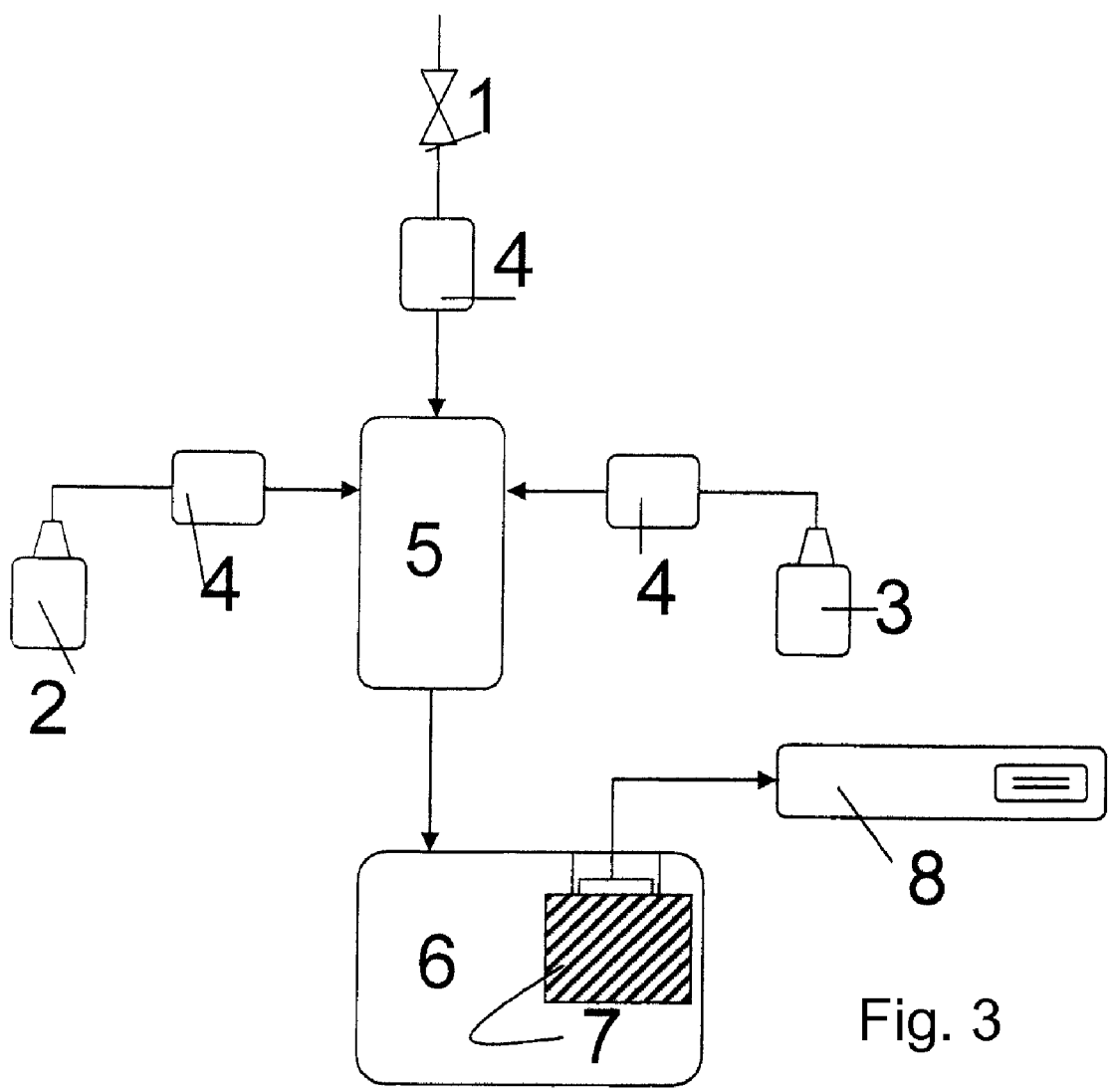
FIG. 3 is a diagram showing an example of a possible design for testing the filters with respect to HCN.

FIG. 3 shows an example of a possible design for testing the filters with respect to HCN and $SO_2$. Test air is sent in a controlled manner into a mixing vessel 5 via a test air supply 1 through a metering unit 4; HCN can be admitted into said mixing vessel 5 by an in-situ reaction of a sulfuric acid 3 and a KCN solution 2, likewise via a respective metering unit 4. Filter 7 is accommodated in a test container 6. The retention capacity of the filter 7 can be recorded by a measuring device 8.

The exemplary retention time of a Zn/Mo-impregnated activated carbon according to the present invention with approx. 7 wt. % of $H_2O$ against 5,000 ppm harmful gas in a class 2 filter according to EN 14387 is shown in Table 3.

TABLE 3

| 5,000 ppm harmful gas | Retention time | Retention time according to the EN 14387 standard |
| --- | --- | --- |
| $C_6H_{12}$ | 47 minutes | 35 minutes |
| HCN | 45 minutes | 25 minutes |
| $Cl_2$ | 30 minutes | 20 minutes |
| $SO_2$ | 25 minutes | 20 minutes |
| $H_2S$ | 70 minutes | 40 minutes |
| $NH_3$ | 43 minutes | 40 minutes |

The present invention offers a technically meaningful solution to the known problem of cyanogen formation by chromate-free and copper-containing activated carbons, according to which Cu(II) compounds can be eliminated in the impregnation for the activated carbon. The storage stability of the impregnated activated carbon is markedly improved by the elimination of copper compounds. Sufficiently good protection against $SO_2$ and $H_2S$ is offered by the use of oxo anions of molybdenum on the activated carbon even at a lower water content in the sorption agent. Furthermore, the zinc compound are preferably in the form of an oxide, carbonate, halide, hydroxide, sulfate and/or oxo or polyoxo anions of molybdate.

While specific embodiments of the invention have been described in detail to illustrate the application of the principles of the invention, it will be understood that the invention may be embodied otherwise without departing from such principles.

What is claimed is:

1. A sorption agent comprising activated carbon and an impregnation of the activated carbon for protection against air pollutants or gaseous harmful substances, the impregnation containing:
   0.5 wt. % to 15 wt. % of at least one zinc compound, wherein the zinc compound is in the form zinc carbonate and zinc halide, and
   0.5 wt. % to 15 wt. % of at least one molybdenum compound, wherein the molybdenum compound is a molybdate, each wt. % being relative to the dry weight of the impregnated activated carbon, and
   wherein the sorption agent contains:
   no chromium and no chromium compound; and
   no copper and no copper compound.

2. A sorption agent in accordance with claim 1, wherein the molybdenum compound is a sodium molybdate.

3. A sorption agent in accordance with claim 1, wherein the zinc compound is also in the form of an hydroxide, and/or oxo or polyoxo anions of molybdate.

4. A sorption agent in accordance with claim 1, wherein the sorption agent contains no silver and no silver compounds.

5. A sorption agent in accordance with claim 1, further comprising:
   no more than 7 wt. % of $H_2O$.

6. A sorption agent in accordance with claim 1, wherein:
   the molybdenum compound is a dioxo anion or polyoxo anion compound.

7. A process for preparing a sorbent, the process comprising the steps of:
   providing activated carbon, zinc carbonate, ammonium chloride, ammonium carbonate and sodium molybdate;
   dissolving the zinc carbonate, ammonium chloride, ammonium carbonate and sodium molybdate in an impregnating solution;
   impregnating the activated carbon with the impregnating solution;
   drying the thus impregnated activated carbon by heating and obtaining an impregnation on the activated carbon comprising,
   0.5 to 15 weight % of at least one zinc chloride compound, wherein the zinc compound is zinc chloride and zinc carbonate, and
   0.5 to 15 weight % sodium molybdate, each based on the dry weight of the impregnated activated carbon and wherein the sorbent contains no chromium and no chromium compound and no copper and no copper compound.

8. A process in accordance with claim 7, wherein:
   said impregnation on the activated carbon includes no more than 7 wt. % of $H_2O$ in the final impregnation on the activated carbon.

9. A process in accordance with claim 7, wherein:
   the sodium molybdate is a dioxo anion or polyoxo anion compound.

10. A method for simultaneously filtering HCN, $SO_2$ and $H_2S$ from an environment to provide breathing air to a user, the method comprising: providing a gas-filtering element containing a sorption agent comprising activated carbon; impregnating the activated carbon with 0.5 wt. % to 15 wt. % of zinc chloride and zinc carbonate and 0.5 wt. % to 15 wt. % of sodium molybdate, each wt. % being relative to the dry weight of the impregnated activated carbon, and with no chromium, no chromium compound, no copper and no copper compound; feeding air contaminated with HCN, SO2 and H2S through the gas filtering element; filtering out any HCN, SO2 and H2S with the gas filtering element without generating cyanogen in the breathing air to be fed to the user.

11. A method in accordance with claim 10, wherein the sorption agent contains no silver and no silver compounds.

12. A method in accordance with claim 10, wherein the filter is a respirator canister.

13. A method in accordance with claim 10, wherein:
   said impregnating includes no more than 7 wt. % of $H_2O$ in the final impregnation of the activated carbon.

14. A method in accordance with claim 10, wherein:
   said impregnating includes providing zinc carbonate, ammonium chloride, ammonium carbonate and sodium molybdate, and dissolving the zinc carbonate, ammonium chloride, ammonium carbonate and sodium molybdate in an impregnating solution to impregnate the activated carbon.

* * * * *